United States Patent
Flindall

(10) Patent No.: US 6,929,287 B2
(45) Date of Patent: Aug. 16, 2005

(54) APPARATUS FOR CONNECTING FLANGED PIPES

(75) Inventor: Stephen John Flindall, Glengarnock (GB)

(73) Assignee: P-Quip Limited, Linwood (GB)

( * ) Notice: Subject to any disclaimer, the term of this patent is extended or adjusted under 35 U.S.C. 154(b) by 0 days.

(21) Appl. No.: 10/450,746

(22) PCT Filed: Dec. 12, 2001

(86) PCT No.: PCT/GB01/05532
§ 371 (c)(1),
(2), (4) Date: Jun. 16, 2003

(87) PCT Pub. No.: WO02/50465
PCT Pub. Date: Jun. 27, 2002

(65) Prior Publication Data
US 2004/0036293 A1 Feb. 26, 2004

(30) Foreign Application Priority Data
Dec. 20, 2000 (GB) .............................................. 0030997

(51) Int. Cl.⁷ .............................................. F16L 35/00
(52) U.S. Cl. ............................ 285/18; 285/920; 285/95
(58) Field of Search .............................. 285/145.4, 101, 285/106, 148.5, 920, 412, 95, 18

(56) References Cited

U.S. PATENT DOCUMENTS

| 2,076,042 A | * | 4/1937 | Penick et al. ................ 285/920 |
| 3,653,671 A | | 4/1972 | Shipes |
| 4,239,266 A | * | 12/1980 | Mynhier ..................... 285/323 |
| 4,317,586 A | * | 3/1982 | Campbell ..................... 285/95 |
| 4,475,750 A | * | 10/1984 | Campbell ..................... 285/95 |
| 4,496,172 A | * | 1/1985 | Walker ........................ 285/18 |
| 4,550,935 A | * | 11/1985 | Marshall et al. ............. 285/920 |
| 4,856,594 A | * | 8/1989 | Jennings ...................... 285/18 |
| 4,987,956 A | * | 1/1991 | Hansen et al. .............. 285/920 |
| 5,572,920 A | * | 11/1996 | Kennedy et al. .............. 92/128 |

FOREIGN PATENT DOCUMENTS

| CH | 429 335 A | 1/1967 |
| GB | 854763 A | 11/1960 |
| JP | 06169070 A | 1/1996 |

* cited by examiner

Primary Examiner—Aaron Dunwoody
(74) Attorney, Agent, or Firm—Drinker Biddle & Reath LLP

(57) ABSTRACT

An apparatus for connecting two flanged pipes comprises at least one piston arrangement having a pair of opposed pistons slidable within a hydraulic cylinder. Each pair of pistons has a rod extending therefrom and is adapted to receive a threaded fastener at its end remote from the piston. Each rod extends through an aperture at the respective cylinder end and is adapted to pass through a respective aperture in the flange of a flanged pipe. Each piston has an associated biasing means in the form of a spring or similar which urges the piston away from its respective cylinder end. Pressurization of the hydraulic fluid in the cylinder causes the piston to move towards its respective cylinder end against the urging action of the biasing means, to allow the hand tightening of the threaded fastener. When the pressure is removed the action of the spring biases the flanges of the flanged pipes together to energize the ring seal between each flange and the apparatus.

17 Claims, 4 Drawing Sheets

APPARATUS FOR CONNECTING FLANGED PIPES

BACKGROUND OF THE INVENTION

This invention relates to an apparatus for connecting flanged pipes, particularly large diameter flanged pipes which in use are subject to high pressure such as risers in oil-field applications.

It is a well-known requirement that shorter sections of pipe such as riser sections must be joined together to form longer pipes or risers. Such pipe sections are provided in standard lengths and delivered to the location in which the pipe is to be installed. Each section has a circular flange at each end, each flange being provided with a number of apertures and a circumferential groove in the mating surface of the flange, in which may be placed a ring seal. Two pipe sections are brought together such that the mating surfaces are aligned with a ring seal between them. Threaded fasteners or bolts are placed in the apertures and nuts are tightened onto the bolts. The nuts are tightened to a predetermined torque in order to energise the ring seal.

The known method of joining flanged riser sections suffers from the disadvantage that it is slow and difficult to carry out under adverse conditions. The method requires considerable strength, skill and reliability of operators, together with the use of heavy tools in confined spaces or areas of difficult access. Furthermore, the securing force is dependent on the extent of wear and the general condition of the threaded fasteners.

JP 0800-11063 discloses an auxiliary device for tightening the nuts and bolts that fasten the flanges of pipe sections. A piston portion of the device is attached to each of the bolts and hydraulic pressure is applied to the piston head which draws each bolt towards the device allowing the associated nut to be manually tightened. However, time and effort is required to attach each piston portion of the device to, and remove the portion from, each individual bolt for tightening the associated nut.

According to a first aspect of the invention, there is provided an apparatus for connecting two flanged pipes comprising at least one piston arrangement having a pair of opposed pistons slidable within a hydraulic cylinder, each of said pair of pistons having a rod extending therefrom and adapted to receive a fastener at its end remote from the piston, each of said rods extending through an aperture at the respective cylinder end and being adapted to pass through a respective aperture in the flange of a flanged pipe, each of said pistons having an associated biasing means which urges the piston away from its respective cylinder end, wherein pressurisation of hydraulic fluid in the cylinder causes the piston to move towards its respective cylinder end against the urging action of the biasing means.

In use the apparatus may be placed between two flanged pipes such that the two opposing rods of the piston arrangement extend through the respective apertures in the flanges of the two flanged pipes. Nuts are secured to threaded ends of the rods, so that the apparatus is securely held between the two flanged pipes. When the hydraulic fluid is pressurised the pistons are forced against the biasing action so that the rods and nuts move outwards. The nuts may then be further tightened onto the threaded ends of the rods. When the pressure in the hydraulic fluid is removed the biasing means urges the pistons towards each other, so energising the connection between each flanged pipe and the apparatus.

Preferably the fastener is a threaded fastener. Preferably, the apparatus comprises a cylindrical body. Preferably, the cylindrical body has an axial through bore. This bore is preferably the same size as the internal bore of the two pipe sections to be joined. When the apparatus is used to join two pipe sections, the axial through bore is aligned with the internal bore of each of the pipe sections.

Preferably, the apparatus comprises a plurality of said piston arrangements spaced at intervals about and externally of the through bore. Preferably, there are four or more piston arrangements spaced equidistantly on a circumference. Preferably, the piston arrangements are arranged such that the pistons move parallel to the axis of the through bore. A standard flange has 12 apertures, so the apparatus for joining pipes having such flanges would have 12 piston arrangements arranged at the same relative positions as the 12 apertures.

Preferably, each of the biasing means comprises a spring. The spring may be arranged around the rod and may act between the piston and the respective end wall of the cylinder. Typically the spring comprises a number of conical washers, although a helical spring of appropriate stiffness may be used.

Preferably, hydraulic fluid is provided between the pistons in the cylinder. Preferably, the apparatus comprises one or more hydraulic fluid passages communicating with the one or more hydraulic cylinders at a connection point in each of the cylinders arranged between the two pistons.

Preferably the apparatus comprises first and second bearing faces at opposite ends adapted to bear in use against the end faces of the pipes to be joined. Preferably each of the bearing faces is provided with a circumferential groove adapted to house a ring seal.

According to a second aspect of the invention, there is provided a pipe connection comprising a first pipe having a first flange at the end thereof, a second pipe having a second flange at the end thereof, and an apparatus according to the first aspect of the present invention.

Preferably, the two opposing rods of the piston arrangement extend through respective apertures in the flanges of the two pipes.

Preferably, the pipe connection further comprises a threaded fastener secured to the end of each of the rods. Preferably, the end of each rod is provided with an external thread and the threaded fastener is a nut.

Preferably, the number of piston arrangements is equal to the number of apertures in each flange.

According to a third aspect of the invention, there is provided a method for connecting first and second flanged pipes, the method comprising the steps of:

(a) providing an apparatus comprising at least one piston arrangement having first and second opposed pistons slidable within a hydraulic cylinder, each of said first and second pistons having a rod extending therefrom and having associated biasing means adapted to bias the piston away from the end of the cylinder;

(b) placing the apparatus between the opposing flanges of the flanged pipes such that the rod of the first piston projects through an aperture in the flange of the first pipe and the rod of the second piston projects through an aperture in the flange of the second pipe;

(c) securing a fastener to each of the rods and tightening the fastener against the respective flange;

(d) pressurising the cylinder between the pistons to cause the pistons and rods to move away from each other and to cause the fasteners to move away from the respective flanges;

(e) tightening further each fastener against the respective flange; and (f) reducing the pressure in the cylinder to cause the pistons and rods to move towards each other under the action of the biasing means and to cause the fasteners to apply a greater clamping force to the respective flanges.

Preferably the or each fastener is a threaded fastener.

Steps (d) to (f) may be repeated as required, particularly in the case when a seal ring is provided between the apparatus and each of the flanges, and the seal ring deforms plastically under the action of the increased clamping force.

The method may further include the step of measurement of the clamping force. The force may be measured using at least one tension indicator connected to the or each fastener. Alternatively, the force may be measured using at least one load washer.

Preferably the apparatus is an apparatus according to the first aspect of the invention.

According to a fourth aspect of the invention, there is provided an apparatus for connecting a first pipe having a flange and a second pipe comprising at least one piston arrangement having a piston slidable within a hydraulic cylinder, the piston having a rod extending therefrom and adapted to receive a fastener at its end remote from the piston, said rod extending through an aperture at the respective cylinder end and being adapted to pass through a respective aperture in the flange of the first flanged pipe, said piston having an associated biasing means which urges the piston away from its respective cylinder end, wherein pressurisation of hydraulic fluid in the cylinder causes the piston to move towards its respective cylinder end against the urging action of the biasing means.

Preferably the apparatus further comprises a flange remote from said rod for abutting a flange provided on the second flanged pipe. Preferably the flange of the apparatus has at least one aperture for receiving one or more fasteners. Alternatively the apparatus further comprises a weld neck remote from said rod for welding of the apparatus to the second flanged pipe. Alternatively the apparatus forms an integral part of the inlet of an item of equipment.

According to a fifth aspect of the invention, there is provided a method for connecting a first pipe having a flange and a second pipe, the method comprising the steps of:

(a) providing an apparatus comprising at least one piston arrangement having a piston slidable within a hydraulic cylinder, said piston having a rod extending therefrom and having associated biasing means adapted to bias the piston away from the end of the cylinder;

(b) placing the apparatus between the pipes such that the rod of the piston projects through an aperture in the flange of the first pipe;

(c) securing a fastener to the or each rod and tightening the fastener against the flange of the first pipe;

(d) pressurising the cylinder between the or each piston to cause the or each piston and rod to move away from each other and to cause the or each fastener to move away from the flange of the first pipe;

(e) tightening further the or each fastener against the flange of the first pipe; and (f) reducing the pressure in the cylinder to cause the or each piston and rod to move towards each other under the action of the biasing means and to cause the or each fastener to apply a greater clamping force to the flange of the first pipe.

Preferably the apparatus further comprises a flange remote from said rod and having at least one aperture, the second pipe is provided with a flange having at least one aperture, and the method further comprises the step of locating a bolt through the or each aperture of the flange of the apparatus and the or each aperture of the flange of the second pipe, securing a fastener to the or each bolt and tightening the or each fastener.

Alternatively the apparatus further comprises a weld neck remote from said rod, and the method further comprises the step of welding the apparatus to the second pipe.

Example embodiments of the invention will now be described by way example only, with reference to the accompanying Figures, in which:—

DETAILED DESCRIPTION OF THE INVENTION

Figure 1:
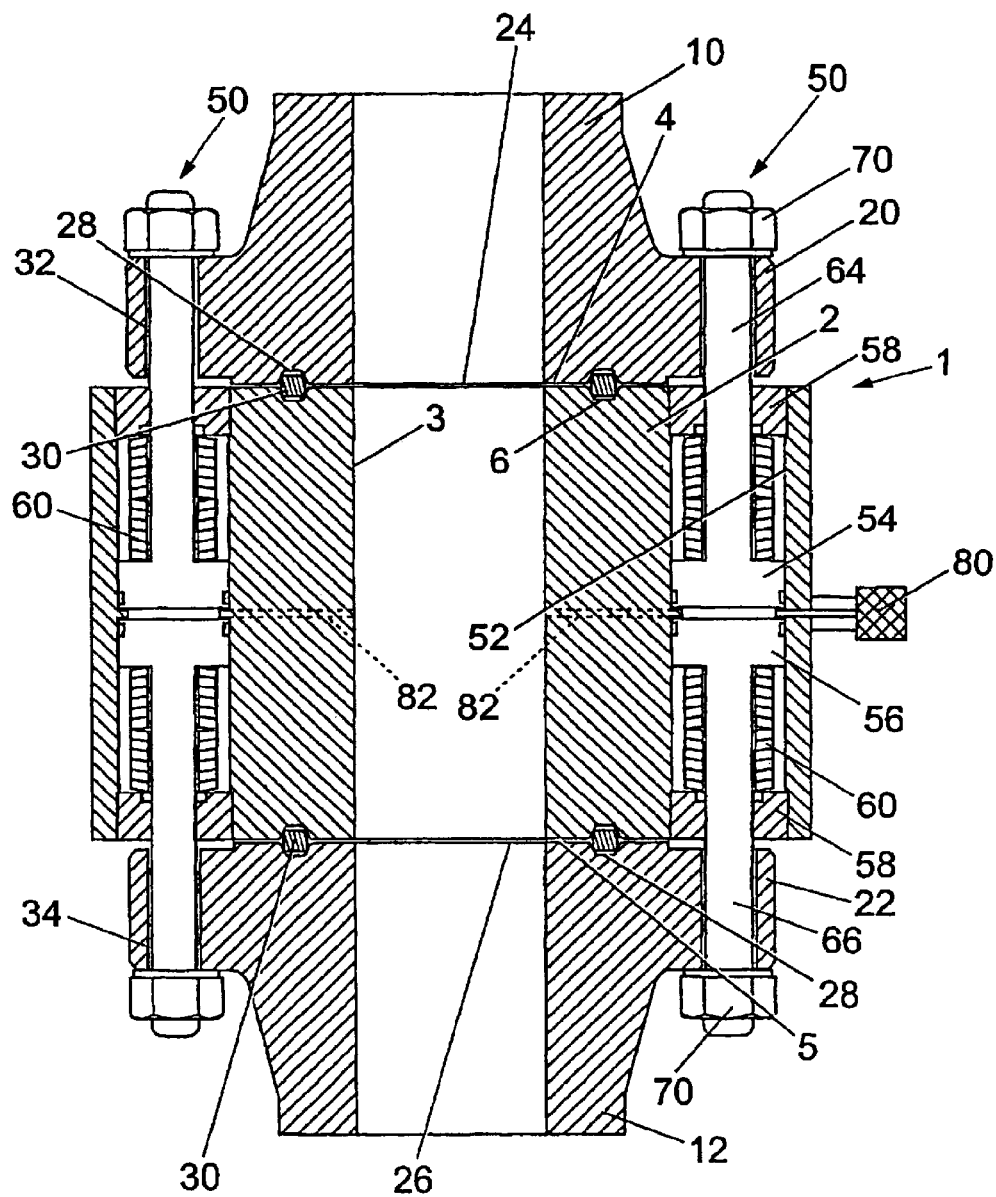
FIG. 1 is a sectional view of a connecting apparatus according to the first aspect of the present invention.
Figure 2:
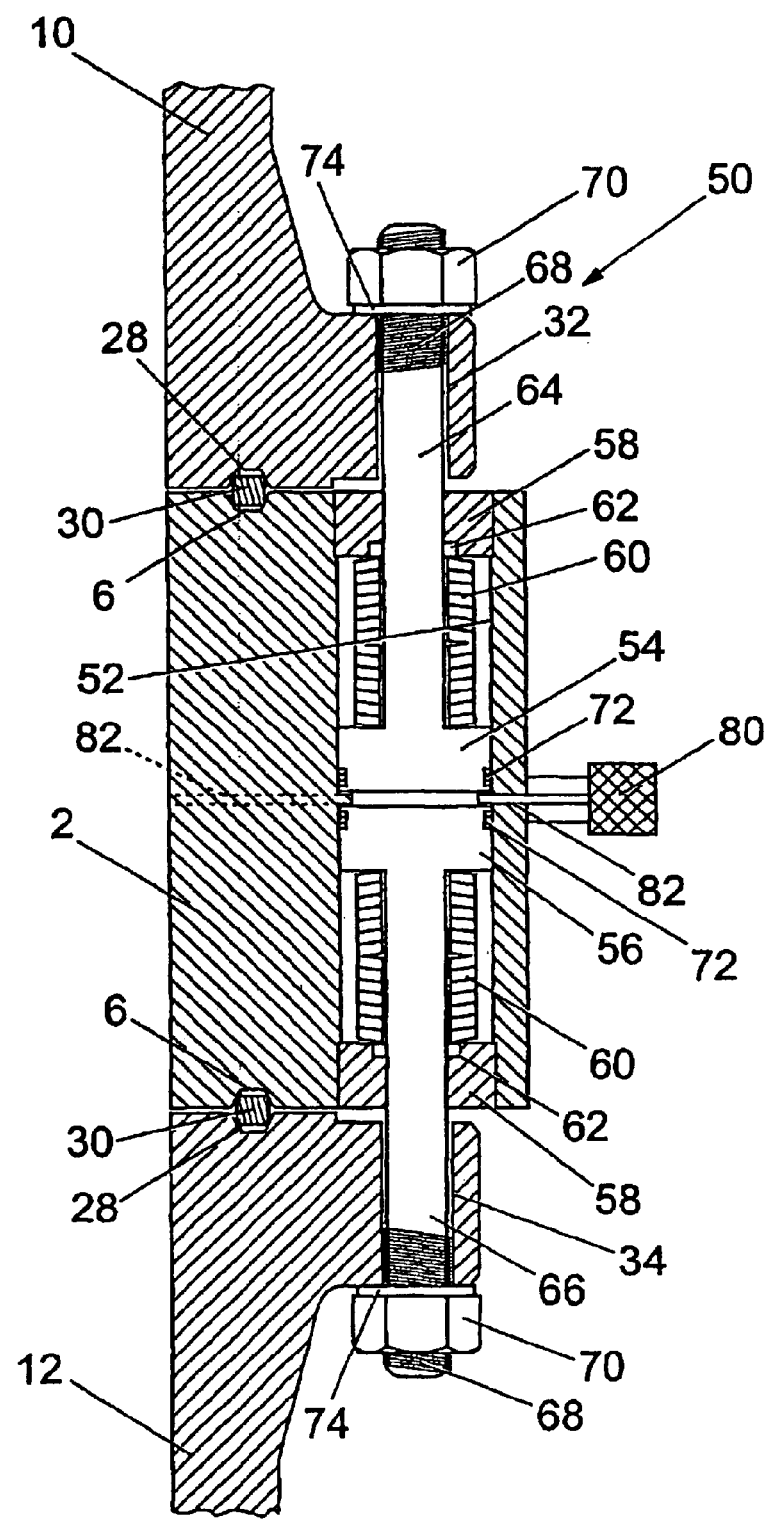
FIG. 2 is an enlarged sectional view of a piston of the connecting apparatus of FIG. 1.
Figure 3:
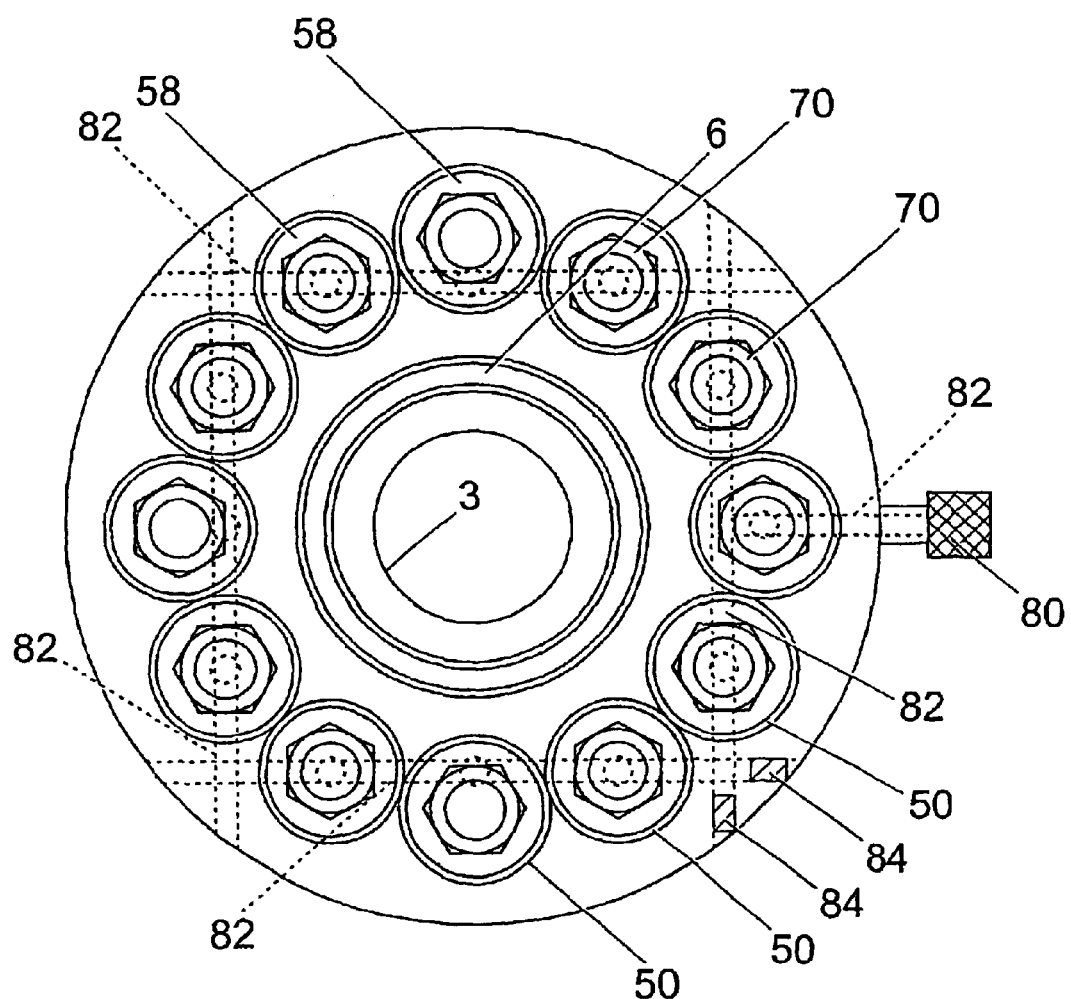
FIG. 3 is a plan view on the apparatus of FIG. 1 with the flange of the pipe and the ring seal omitted for clarity.

A connecting apparatus generally described at 1 comprises a cylindrical body 2 having an axial through bore 3. The apparatus is shown in the unenergised state between the first flange 20 of a first pipe 10 and the second flange 22 of a second pipe 12. Between each of the end faces 4, 5 of the cylindrical body 2 and the respective end faces 24, 26 of the flanges 20, 22 there is provided a ring seal 30 which, in its unenergized state, stands proud of the circular grooves 6, 28 in the end faces 4, 5, 24, 26 of the cylindrical body 2 and flanges 20, 22, thereby creating a gap between the adjacent faces 4, 5, 24, 26 of the cylindrical body 2 and flanges 20, 22.

In order to prevent the existence of this gap, and to provide an effective seal between the flanges 20, 22 and the cylindrical body 2, it is necessary to forcibly push the flanges 20, 22 against the cylindrical body 2. This is achieved by the piston arrangements generally indicated at 50. The effect of compressing the flanges 20, 22 against the cylindrical body 2 is to energise or compress the seal 30. This compression is desirable to increase the effectiveness and efficiency of the seal 30.

Each piston arrangement 50 includes a cylinder 52 adapted to house an opposed pair of slidable pistons 54, 56, a plug 58 closing each end of the cylinder 52 and clamping springs 60. The pistons are provided with piston rings 72 which seal between the pistons 54, 56 and the cylinder 52. The springs 60 serve to bias the pistons away from the plugs 58 at the ends of the cylinder 52. Each piston 54, 56 is provided with an integral rod 64, 66 which extends through an aperture in the plug 58 sealed with an O-seal 62. The springs 60 are provided around the rods 64, 66 and act between the plugs 58 and the piston bodies 54, 56. The rod 64, 66 is provided with an externally threaded portion 68 at its free end, adapted to receive an internally threaded nut 70.

The rod 64, 66 passes through an aperture 32, 34 provided in the respective flange 20, 22. A washer 74 is provided between the nut 70 and the flange 20, 22. One or more dowels (not shown) engage both the piston 54, 56 and the cylinder 52 in each arrangement for the purpose of preventing rotation of the piston 54, 56 when the nut 70 is tightened.

In the embodiment shown, there are provided 12 piston arrangements 50 arranged equidistantly on a circumference whose radius corresponds to the radius of the circumference in which the apertures 32, 34 in the flanges are arranged. The piston arrangements are permanently secured to the cylindrical body 2, although the nuts 70 are detachable, thereby allowing removal of the flanges 20, 22 from the connecting apparatus 1.

A hydraulic hose connection 80 is provided at the edge of the cylindrical body 2. A network of hydraulic fluid passages 82 links the connection 80 to the central portion of each of the cylinders 52 of the piston arrangements 50. These passages 82 are formed by drilling and then plugging the ends 84, so that the passages 82 do not communicate with the exterior except through the hose connection 80.

The connecting apparatus 1 can be used to connect any flanged pipes, but it is particularly appropriate for use with 7 1/16" snubbing riser sections, when a number of flanged connections (typically 10 to 15) need to be made up in as short a time as possible in order for the snubbing or oil drilling rig to be able to start its drilling operation. During assembly the individual lengths of riser must be connected at a location above the rig floor which is difficult to access.

In use, a connecting apparatus 1 is provided which has an internal bore 3 equal in size to the bore of the pipe sections 10, 12 to be joined. The upper and lower faces 4, 5 of the apparatus have gasket or ring seal arrangements which match those on the flanges 20, 22 of the pipe sections 10, 12 to be joined. The apparatus 1 has a number of threaded connecting rods 64, 66 protruding from each face 4, 5 and these are engaged with corresponding apertures 32, 34 in the flanges 20, 22. The threaded connecting rods 64, 66 are equal in number, length and diameter to the threaded connectors used to join conventionally the pipe sections 10, 12.

Once the apparatus 1 is in place between the opposing flanges 20, 22 of the flanged pipes such that the rods 64 on the upper side project through the apertures 32 in the flange 20 of the upper pipe 10 and the rods 66 on the lower side project through the apertures 34 in the flange 22 of the lower pipe 12, a threaded fastener or nut 70 is secured to each of the rods 64, 66 and the fastener 70 is tightened against the respective flange 20, 22. It is only necessary to tighten the nuts 70 by hand or to a low torque at this stage, sufficient to cause the nuts 70 to bed down.

The following sequence of events is then followed:
1. The cylinders 52 are hydraulically pressurised between the pistons 54, 56 to cause the pistons 54, 56 and rods 64, 66 to move away from each other thereby compressing the springs 60 and causing the threaded fasteners 70 to move away from the respective flanges 20, 22;
2. Each fastener 70 is tightened further against the respective flange 20, 22 (again low torque or hand tightening is appropriate);
3. The pressure in the cylinders 52 is reduced to cause the pistons 54, 56 and rods 64, 66 to move towards each other under the action of the springs 60 which serve as biasing means and to cause the threaded fasteners to apply a greater clamping force to the respective flanges.

Steps 1 to 3 above may be repeated as required, until the required clamping force is achieved, so that the tension in the rods 64, 66 is equal to the tension exerted on the equivalent studs of a standard threaded stud connection by tightening them to their recommended torque. Therefore, should the connecting apparatus 1 fail for any reason, the fasteners 70 can be removed using conventional tools.

When a seal ring 30 is provided between the apparatus 1 and each of the flanges 20, 22, repetition of steps 1 to 3 may be necessary, since the seal ring 30 deforms plastically under the action of the increased clamping force, to form a seal against the inclined sides of the seal groove 6.

Measurement of the clamping force can be performed, in order to verify the clamping force provided by each piston arrangement 50. To measure the force, a number of tension indicators (not shown) can be connected to the fastener 70 in a manner known in the art. Alternatively, the force may be measured using one or more conventional load washers (not shown).

Figure 4:
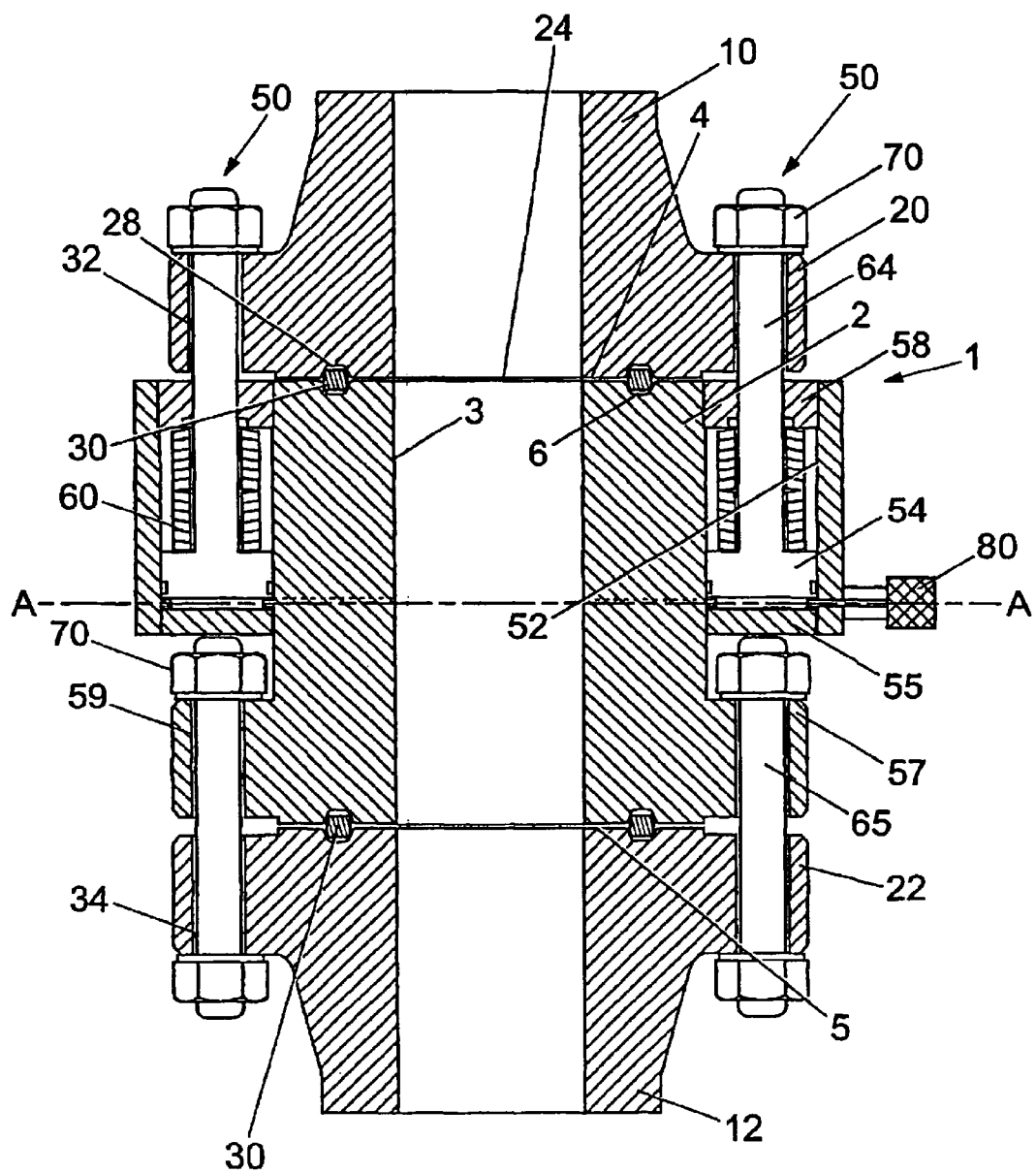
FIG. 4 is a sectional view of a connecting apparatus according to the fourth aspect of the present invention.

FIG. 4 shows a second embodiment of the present invention. The apparatus is identical to that of the first embodiment above the line A—A shown in the figure, and identical elements will not be described.

In this embodiment, the connecting apparatus 1 comprises only one piston 54 within each piston arrangement 50. The cylinder 52 is blanked off at the head end 55. Thus, when the cylinders are pressurised via the hydraulic connection 80, the hydraulic pressure will act only on one piston head 54 for each piston arrangement 50.

Connection to a first pipe, using the piston arrangements 50, is the same as described above. The apparatus also comprises a conventional flange 57 with apertures 59 for connecting the apparatus 1 to the flange 22 of the second pipe 12. The two flanges 22, 57 may be joined together using any conventional means such as nuts 70 and bolts 65.

While the embodiment of FIG. 4 includes a conventional flange 57 and nuts 70 and bolts 65, the connecting apparatus 1 may be connected to the second pipe 12 in other ways known in the art. For instance, the apparatus may be provided with a weld neck (not shown), allowing welding of the apparatus 1 to the second pipe 12. Typically, the second pipe would not require a flange 22 and the weld neck would be sized to fit around the outer diameter of the pipe 12. The apparatus 1 could then be seam welded to the pipe 12. In another alternative, a manufacturer may provide the apparatus 1 comprising a single piston 54 for each piston arrangement 50 at the inlet of an item of equipment.

The embodiment of the invention comprising a single piston 54 for each piston arrangement 50 can allow the apparatus 1 to be permanently attached to a pipe or item of equipment.

Referring now to either embodiment of the invention, it should be noted that the piston arrangement 50 of the apparatus and method described herein allows the nuts 70 to be tightened by hand and does not require a large torque. It will be appreciated that this is a considerable advantage over the requirement of using heavy tools which has been the practice in the past. Such tools include conventional wrenches and torquing devices, flogging wrenches and sledge hammers.

The invention permits greater repeatability and reliability of connections, since the hydraulic pressure to which the pistons 54, 56 are subjected may be monitored. Typically a pressure of between 10,000 and 20,000 psi may be achieved. Furthermore, the need for intensive manual or skilled labour by operators is also mitigated. Similarly, there is a reduced danger of injury to operators or bystanders during such operational and maintenance functions.

A further advantage of the invention is that the clamping pressure may be predetermined by the springs and it is possible to achieve uniform pressure around the periphery of the liner, which enables perfect liner alignment.

Other advantages of the invention will become apparent to operators and associated personnel involved in the implementation and operation of the invention, including the fact that reduced time is required to affect the connection of the pipes.

Further modifications and improvements may be incorporated without departing from the scope of the invention.

What is claimed is:

1. An apparatus for connecting two flanged pipes comprising at least one piston arrangement having a pair of opposed pistons slidable within a hydraulic cylinder,
   each of said pair of pistons having a rod extending therefrom, said rod having a remote end remote from the piston and being provided with a removable fastener at said remote end,
   each of said rods extending through an aperture at the respective cylinder end and being adapted to pass through a respective aperture in the flange of a flanged pipe,
   each of said pistons having an associated biasing means which urges the piston away from the respective cylinder end,
   wherein pressurization of hydraulic fluid in the cylinder causes the piston to move towards the respective cylinder end against the urging action of the biasing means.

2. An apparatus according to claim 1, wherein the remote end of the rod has a threaded outer surface and the removable fastener is a threaded fastener.

3. An apparatus according to claim 1, comprising a cylindrical body having an axial through bore.

4. An apparatus according to claim 3, comprising a plurality of said piston arrangements spaced at intervals about and externally of the through bore.

5. An apparatus according to claim 1, wherein each of the biasing means comprises a spring arranged around the rod.

6. An apparatus according to claim 1, further comprising one or more hydraulic fluid passages communicating with the one or more hydraulic cylinders at a connection point in each of the cylinders arranged between the two pistons.

7. An apparatus according to claim 1, further comprising first and second bearing faces at opposite ends adapted to bear in use against the end faces of the pipes to be joined, each of the bearing faces being provided with a circumferential groove adapted to house a ring seal.

8. A pipe connection comprising a first pipe having a first flange at the end thereof, a second pipe having a second flange at the end thereof, and an apparatus according to claim 1, wherein the two opposing rods of the one or more piston arrangements extend through respective apertures in the flanges of the two pipes.

9. A pipe connection according to claim 8, wherein the number of piston arrangements is equal to the number of apertures in each flange.

10. A method for connecting first and second flanged pipes having opposing flanges, the method comprising the steps of:
   (a) providing an apparatus comprising at least one piston arrangement having first and second opposed pistons slidable within a hydraulic cylinder, each of said first and second pistons having a rod extending therefrom and having associated biasing means adapted to bias the piston away from the end of the cylinder;
   (b) placing the apparatus between the opposing flanges of the flanged pipes such that the rod of the first piston projects through an aperture in the flange of the first pipe and the rod of the second piston projects through an aperture in the flange of the second pipe;
   (c) securing a fastener to each of the rods and tightening the fastener against the respective flange;
   (d) pressurizing the cylinder between the pistons to cause the pistons and rods to move away from each other and to cause the fasteners to move away from the respective flanges;
   (e) tightening further each fastener against the respective flange; and
   (f) reducing the pressure in the cylinder to cause the pistons and rods to move towards each other under the action of the biasing means and to cause the fasteners to apply a greater clamping force to the respective flanges.

11. A method according to claim 10 wherein steps (d) to (f) are repeated.

12. A method according to claim 10 further comprising the step of measuring the clamping force applied by at least one fastener.

13. An apparatus for connecting a first pipe having a flange and a second pipe, the apparatus comprising at least one piston arrangement having a piston slidable within a hydraulic cylinder,
   the piston having a rod extending therefrom, said rod having a remote end remote from the piston and being provided with a fastener at said remote end,
   said rod extending through an aperture at the respective cylinder end and being adapted to pass through a respective aperture in the flange of the first flanged pipe,
   said piston having an associated biasing means which urges the piston away from its respective cylinder end,
   wherein pressurization of hydraulic fluid in the cylinder causes the piston to move towards its respective cylinder end against the urging action of the biasing means.

14. An apparatus according to claim 13, further comprising a flange remote from said rod for abutting a flange provided on the second pipe, and wherein the flange of the apparatus has at least one aperture for receiving one or more fasteners.

15. An apparatus according to claim 13, wherein the second pipe is the inlet of an item of equipment.

16. A method for connecting a first pipe having a flange and a second pipe, the method comprising the steps of:
   (a) providing an apparatus comprising at least one piston arrangement having a piston slidable within a hydraulic cylinder, said piston having a rod extending therefrom and having associated biasing means adapted to bias the piston away from the end of the cylinder;
   (b) placing the apparatus between the pipes such that the rod of the piston projects through an aperture in the flange of the first pipe;
   (c) securing a fastener to the or each rod and tightening the fastener against the flange of the first pipe;
   (d) pressurizing the cylinder between the piston and the second end of the cylinder to cause the piston and rod to move away from the second end and to cause the fastener to move away from the flange of the first pipe;
   (e) tightening further the fastener against the flange of the first pipe; and (f) reducing the pressure in the cylinder to cause the piston and rod to move towards the second end under the action of the biasing means and to cause the fastener to apply a greater clamping force to the flange of the first pipe.

17. A method according to claim 16, wherein the apparatus further comprises a flange remote from said rod and having at least one aperture, the second pipe is provided with a flange having at least one aperture, and the method further comprises the step of locating a bolt through the or each aperture of the flange of the apparatus and the or each aperture of the flange of the second pipe, securing a fastener to the or each bolt and tightening the or each fastener.

* * * * *